June 19, 1973

W. L. GOFFE 3,740,216

PHOTOELECTROSOLOGRAPHIC IMAGING EMPLOYING A RELEASABLE IMAGING LAYER

Filed June 1, 1967

INVENTOR.

WILLIAM L. GOFFE

BY David C. Petre

James J. Ralabate

ATTORNEYS

United States Patent Office 3,740,216
Patented June 19, 1973

3,740,216

PHOTOELECTROSOLOGRAPHIC IMAGING EMPLOYING A RELEASABLE IMAGING LAYER

William L. Goffe, Webster, N.Y., assignor to Xerox Corporation, Rochester, N.Y.

Filed June 1, 1967, Ser. No. 642,830
Int. Cl. B41n 5/00; G03g 13/14
U.S. Cl. 96—1 9 Claims

ABSTRACT OF THE DISCLOSURE

An imaging member comprising a fracturable material in or at the surface of a soluble layer over an adhesively releasable interfacial layer over a substrate is processed to substantially completely remove said soluble layer and form an image pattern of fracturable material on said interfacial layer which is then contacted with a transfer member which is then stripped away whereby said interfacial layer in background pattern is released to said transfer member and said interfacial layer in image pattern is left on said substrate. The image pattern of fracturable material may or may not be stripped off, as desired.

BACKGROUND OF THE INVENTION

This invention relates to imaging and more specifically to a new strip imaging system.

There has recently been developed a migration imaging system capable of producing high quality images of high density, continuous tone, and high resolution, an embodiment of which is described in copending application Ser. No. 460,377, filed June 1, 1965, now U.S. Pat. No. 3,520,681. Generally, according to an embodiment thereof, an imaging member comprising a conducting substrate with a layer of softenable (herein, also intended to include soluble) material, containing photosensitive particles overlaying the conductive substrate is imaged in the following manner: a latent image is formed on the photosensitive surface, for example by uniformly electrostatically charging and exposing it to a pattern of activating electromagnetic radiation. The imaging member is then developed by exposing it to a solvent which dissolves only the softenable layer. The photosensitive particles which have been exposed to radiation migrate through the softenable layer as it is softened and dissolved, leaving an image of migrated particles corresponding to the radiation pattern of an original, on the conductive substrate. The image may then be fixed to the substrate. For many preferred photosensitive particles the image produced by the above process is a negative of a positive original. Those portions of the photosensitive material which do not migrate to the conductive substrate may be washed away by the solvent with the softenable layer.

In general, three basic imaging members may be used: a layered configuration which comprises a conductive substrate coated with a layer of softenable material, and a fracturable and preferably particulate layer of photosensitive material at or embedded near the upper surface of the softenable layer; a binder structure in which the photosensitive particles are dispersed in the softenable layer which overcoats a conducting substrate; and an overcoated structure in which a conductive substrate is overcoated with a layer of softenable material followed by an overcoating of photosensitive particles and a second overcoating of softenable material which sandwiches the photosensitive particles. Fracturable layer or material as used herein is intended to mean any layer or material which is capable of breaking up during development and permitting portions to migrate towards the substrate in image configuration.

This imaging system generally comprises a combination of process steps which includes forming a latent image and developing with solvent liquid or vapor, or heat or combinations thereof to render the latent image visible. In certain methods of forming the latent image non-photosensitive or inert fracturable layers and particulate material may be used to form images, as described in copending application Ser. No. 483,675, filed Aug. 30, 1965, new U.S. Pat. No. 3,656,990, wherein a latent image is formed by a wide variety of methods including charging in image configuration through the use of a mask or stencil; first forming such a charge pattern on a separate photoconductive insulating layer according to conventional xerographic reproduction techniques and then transferring this charge pattern to the members hereof by bringing the two layers into very close proximity and utilizing breakdown techniques as described, for example, in Carlson Pat. 2,982,647 and Walkup Pats. 2,825,814 and 2,937,943. In addition, charge patterns conforming to selected, shaped, electrodes or combinations of electrodes may be formed by the "TESI" discharge technique as more fully described in Schwertz Pats. 3,023,731 and 2,919,967 or by techniques described in Walkup Pats. 3,001,848 and 3,001,849 as well as by electron beam recording techniques, for example as described in Glenn Pat. 3,113,179.

In another variation of this imaging system an image is formed by the selective disruption of a particulate material overlaying or in an electrostatically deformable, or wrinkable film or layer. This variation differs from the system described above in that the softenable layer is deformed in conjunction with a disruption of the particulate material as described more fully in copending application Ser. No. 520,423, filed Jan. 13, 1966, now abandoned.

The characteristics of the images produced by this new system are dependent on such process steps as charging, exposure and development, as well as the particular combination of process steps. High density, continuous tone and high resolution are some of the image characteristics possible. The image is generally characterized as a fixed or unfixed particulate image with or without a portion of the softenable layer and unmigrated portions of the layer left on the imaged member, which can be used in a number of applications such as microfilm, hard copy, optical masks, and strip out applications using adhesive materials.

As disclosed in 3,520,681, the layer of softenable material of the imaging member in some developing techniques is substantially completely washed away and by other developing techniques may at least partially remain behind on the supporting substrate. In the mode of development where this layer is at least partially left behind on the substrate, it was found that the unmigrated fracturable material on the imaging member after development may be adhesively stripped off to yield complementary positive and negative images.

However, no way was found to strip out to yield complementary positive and negative images in connection with the mode of development wherein the softenable layer and the unmigrated fracturable material are substantially completely washed away.

SUMMARY OF THE INVENTION

It is, therefore, an object of this invention to provide a novel imaging system which satisfies the above-noted wants.

It is a further object of this invention to provide a novel imaging member.

It is a still further object of this invention to provide a novel strip out imaging system to simultaneously yield complementary positive and negative images.

It is a still further object of this invention to provide a novel imaging system capable of producing complementary positive and negative images.

It is a still further object of this invention to provide an imaging system to produce lithographic duplicating masters.

The foregoing objects and others are accomplished in accordance with this invention by providing an imaging member comprising a fracturable material in or at the surface of a soluble layer over an adhesively releasable interfacial layer over a substrate which is processed to substantially completely remove said soluble layer and form an image pattern of fracturable material on said interfacial layer which is then contacted with a transfer member which is then stripped away whereby said interfacial layer in background pattern is released to said transfer member, and said interfacial layer in image pattern is left on said substrate. The image pattern of fracturable material may or may not be stripped off as desired.

BRIEF DESCRIPTION OF THE DRAWINGS

For a better understanding of the invention as well as other objects and further features thereof, reference is made to the following detailed disclosure of this invention taken in conjunction with the accompanying figures wherein.

DESCRIPTION OF THE PREFERRED EMBODIMENTS

Figure 1:
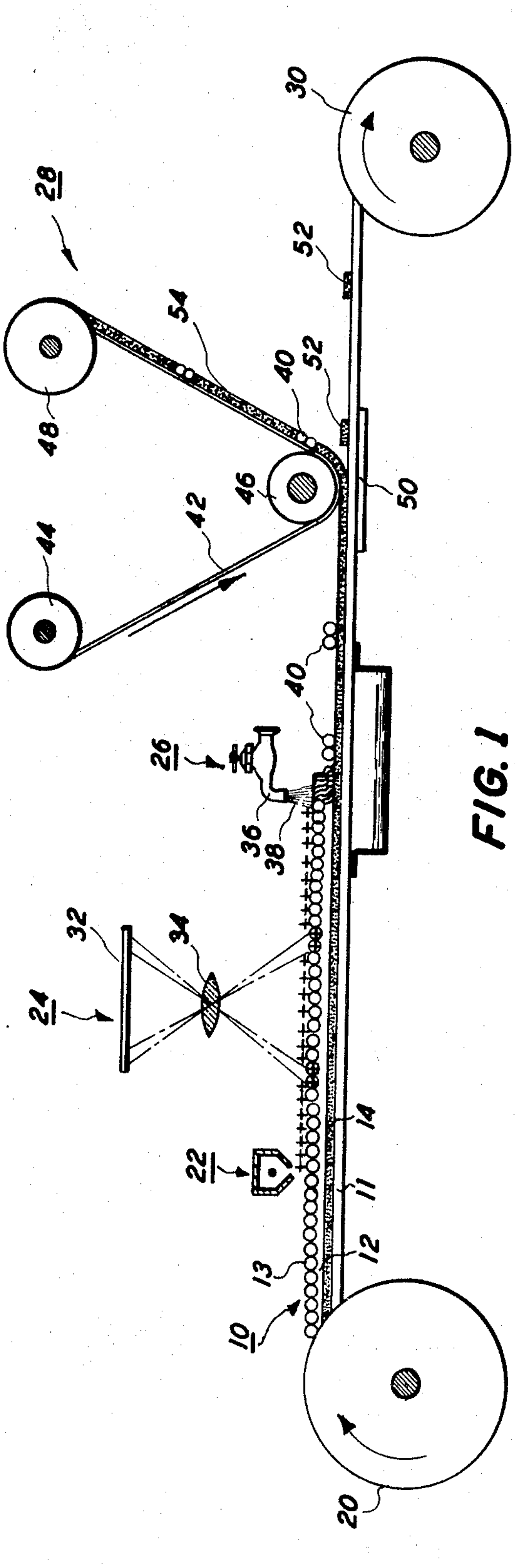
FIG. 1 is a schematic representation of a strip out imaging system according to the invention.

Referring now to FIG. 1 there is illustrated imaging member 10 in the form of a continuous web which passes from supply roller 20 successively past charging means 22, exposure means 24, developing means 26 and strip out station 28 to takeup roll 30.

Member 10 includes substrate 11 which may be electrically conductive or insulating but which possesses sufficient mechanical strength to support overlayers 12, 13, and 14. Substrate 11 may conveniently be a metallic sheet, web, foil, cylinder, plate or the like, glass, conductively coated paper or plastic films and the like. Over substrate 11 is the interfacial layer 14 of this invention. Over layer 14 is a thin layer 12 of electrically insulating soluble material containing concentrated adjacent the free surface of layer 12 a thin layer 13 of photosensitive fracturable material in particulate form. The size of the particles is greatly exaggerated for purposes of illustration. Alternatively, the fracturable material may be more dispersed in the soluble layer for example substantially uniformly dispersed throughout the soluble layer. The soluble layer may be of any suitable thickness, with thicker layers generally requiring a greater corona potential during the charging step to be described. In general, a thickness from about 1 to about 4 microns is found to be preferred to produce optimum quality images and for convenience of charging.

The fracturable material in the form of layer 13 as illustrated in FIG. 1 may comprise any suitable photosensitive fracturable material. While it is preferred for images of highest resolution and density that the fracturable material be particulate, it may comprise any continuous or semi-continuous, such as a Swiss cheese pattern, fracturable layer which is capable of breaking up during the development step and permitting portions to migrate to the substrate in image configuration.

Any suitable photosensitive fracturable material may be used herein. Typical such materials include inorganic or organic photoconductive insulating materials.

The first processing step according to the invention is to form a latent image on member 10. This image is illustratively formed by uniformly electrostatically charging the plate in the dark by means 22 and then exposing the member to a pattern of light and shadow from an original to be reproduced by means 24.

A wide variety of charging systems have been evolved over the years including those useful in the art of xerography, varying from vigorously rubbing the surface of the layer with a soft brush or a fur to more sophisticated corona charging techniques. The corona charging technique is convenient, works well and is thus preferred. For example, corona discharge devices of the general description and generally operated as disclosed in Vyverberg Pat. 2,836,725, an embodiment of which is shown as charging means 22, and Walkup Pat. 2,777,957 have been found to be excellent sources of corona useful in the charging of imaging member 10 according to the invention.

After charging, the web moves beneath exposure means 24 whereat a light and shadow pattern of an original 32 to be reproduced is projected onto the web surface by means of lens 34 desirably operating in conjunction with any suitable conventional web exposure mechanism (not shown) both synchronized to the motion of the web.

For purposes of illustration the surface electrical charges are depicted as having moved into the photosensitive material in the illuminated areas. Although this representation is speculative, it is helpful for an understanding of the present invention to consider the electrical charges to be more firmly bound to illuminated areas of material 13 as result of the exposure step.

Any suitable method of forming a latent image on members hereof are included in the invention. Other methods of forming a latent image on member 10 are known in the art and include corona charging through a stencil as shown in aforementioned Pat. 3,656,990, or forming a latent image by the other means described therein where the fracturable material need not be photosensitive. Another mode of optically forming a latent image is to use a member comprising a photoconductive soluble layer and fracturable material which need not be photosensitive as more fuly described in copending application Ser. No. 553,837, filed May 31, 1966, now abandoned. Also, the process steps of optically forming a latent image on members hereof may be manipulated to produce positive or negative migration images from a positive optical image, for example, as described in copending application Ser. No. 635,096, filed May 1, 1967, now abandoned.

The latent image is then rendered visible or developed by developing means 26 comprising source 36 for liquid solvent 38 for soluble layer 12, which at least is briefly contacted with layer 12. Preferably, in the layered fracturable material imaging member configuration, the layer of fracturable material should be permeable to the solvent developer to facilitate in the dissolving away of the soluble layer. The solvent should preferably be a solvent for the soluble material but not for the fracturable material and the substrate and have high enough electrical resistance to prevent the fracturable material from losing its charge before reaching the substrate.

During development, the usual effect of the solvent in non-iluminated areas of fracturable material 13 is to dissolve away soluble material 12 and cause fracturable material 13 to be washed away. However, in illuminated areas where the charge is thought to be more firmly bound to the fracturable material, the material does not wash away but migrates to and adheres to interfacial layer 14 of this invention, in image configuration. The migrated image portions of fracturable material 13 residing on layer 14 are shown as portions 40.

A more detailed disclosure of this mode of development and the materials including photosensitive and non-photosensitive fracturable materials, soluble materials, solvents, substrates, and so on; and imaging member construction variations attendant to member 10 may be found in the aforementioned Pats. 3,520,681 and 3,656,990.

As described herein, development of the imaging members hereof may be accomplished by treatment with various combinations of liquid solvent or vapor or heat. The liquid solvent mode of development is preferred herein because of its simplicity in producing both end results of a migration image and in substantially completely removing the soluble layer, which are preferred results for optimum quality images according to the invention, but any mode of development which produces these two preferred end results may be used.

At stripping station 28, transfer member 42 in the form of a web is advanced from supply roll 44 around positioning roller 46 to takeup roll 48, web 42 being advanced around positioning roll 46 to present the surface of web 42 into preferably non-slipping pressure contact with interface layer 14 and image portions 40 deposited thereon. Backing plate 50 optionally may be used to regulate and control the pressure of the contact of web 42 on image carrying layer 14. As will be seen, web 42 may be opaque in various colors, translucent or transparent depending on the mode of operation and the ultimate use of the web.

The web 42 as it is pulled apart from adhesive contact with layer 14, strips away from substrate 11 portions 54 of layer 14 corresponding to those portions of layer 14 with no fracturable material 13 deposited thereon. Generally, in this mode, image portions 40 from layer 14 will also be stripped away and released to web 42 leaving behind on substrate 11 image portions 52 of layer 14, the image portions 40 having been adhesively stripped therefrom to adhere to web 42. Thus, there is produced complementary negative and positive images, one in the form of image portions 52 on support 11 being wound on takeup roll 30 and the other in the form of image portions 40 and background portions 54 of layer 14 to be wound on takeup roll 48, which optionally may be fixed before being wound on the takeup rolls, to be stored on their respective takeup rolls until ready for use. The reproductions are described as "complementary" and as being "positive" and "negative" as used in the conventional photographic sense.

Figure 2A:
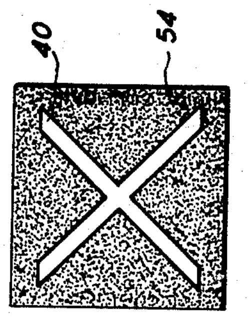
FIGS. 2A and B illustrate the resulting image formation, on the developed imaging member according to the invention, in plan and section, respectively, after the developed imaging member and transfer member have been stripped apart, according to the invention.
Figure 2B:
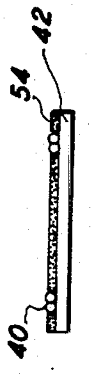
Figure 3A:
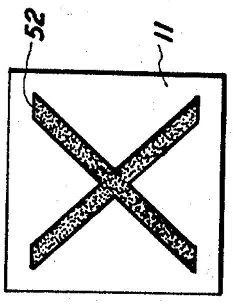
FIGS. 3A and B illustrate resulting image formation on the transfer member in plan and section, respectively, after the developed imaging member and transfer member have been stripped apart, according to the invention.
Figure 3B:
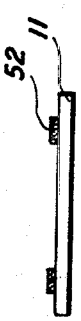

As may be seen in FIGS. 2 and 3, there is shown for illustrative purposes a letter "X" in complementary fashion formed as just described. In FIGS. 2A and B there is illustrated the surface of web 42 completely covered by the combination of fracturable material 40 in image configuration and background portions 54 of interfacial layer 14 in the remaining areas. With a proper choice of materials including a transparent fracturable material 40, a transparent web 42 and an opaque interfacial layer 14, the image illustrated could constitute a negative image projection transparency with the image areas represented by the letter "X" being substantially clear and light transmitting.

Illustrated in FIG. 3, on the other hand, is the image which is complementary to the image illustrated in FIG. 2. Likewise with the proper choice of materials including transparent substrate 11 and an opaque interfacial layer 14, a positive image transparency of the same letter "X" would remain on the substrate, the letter "X" would comprise areas 52 and the background would be substrate 11. As described, there is simultaneously formed in accordance with this invention a complementary positive and negative image either or both of which may be in transparency form depending upon the pre-selection of materials as described.

Of course, in this embodiment, the material comprising layer 14 must adhere sufficiently to web 42 under the pressurized contact at roller 46 to permit this material to more tenaciously adhere to web 42 than to substrate 11 causing those portions of layer 14 corresponding to image background areas to cleanly strip away from substrate 11 and adhere to the web 42.

In this embodiment, interfacial layer 14 should be of sufficient internal bond to permit complete stripping of the film from substrate 11. In order to more readily accomplish the substantially complete stripping of layer 14 in non-image, background areas substrate 11 plays an important role in the stripping process and substantially complete stripping is more readily accomplished if the substrate 11 presents a smooth surface for interfacial layer 14. Additionally, of course, the substrate 11 should offer a bond to interfacial layer 14 of a force greater than the transverse internal bond or strength of layer 14.

Interfacial layer 14 should preferably be electrically conductive if substrate 11 is electrically insulating in order to facilitate in the acceptance of charge by member 10 from charging means 22, but may be electrically conductive or insulating if substrate 11 is electrically conductive. If both the substrate and layer 14 are electrically insulating, double sided corona charging and other techniques known in the art of xerography for charging xerographic plates having insulating backings may be applied. In addition layer 14 should be substantially nonsoluble in solvent developer liquid 38.

Where the interfacial layer 14 is electrically conductive, the invention hereof can be utilized to make printed circuits or circuit boards as is well known in the art.

Any layer 14 satisfying these requirements may be used. Preferred materials for layer 14 because of their excellent strip out characteristics in accordance herewith and because they may be incorporated in member 10 without unduly hindering the processing of the member, include thin films of colloidal graphite in organic binders such as methacrylate resins and colloidal graphite dispersed in such organic non-binder vehicles as mineral oil and isopropanol. Any suitable interfacial layer 14 may be used, including those mentioned in Mayer Pat. 3,275,436. Other known layers which have exhibited properties suitable for the process hereof include evaporated metal coatings, for example, of antimony, aluminum and silver as well as other pigmented organic binder (the binder generally comprising from about 0.5% to 20% by dry weight of the total makeup of the layer) and non-binder systems deposited in a thin film, such exemplary pigments including conductive pigments in the form of powder or particulate forms of most metals, for example, silver, copper, aluminum, iron, magnesium, chromium, conductive metal oxides such as tin oxide and iron oxide, the hexagonal form of selenium, zinc chromate and electrically conductive organic materials such as carbon black, other electrically conductive forms of carbon including graphite and similar conductive pigments. Typical organic binders include such materials as acrylics, polystyrenes, methylates, beeswax and other waxes.

The thickness of interfacial layer is not critical and is largely thought to be a function of resolution desired. Generally, thickness ranges of from about 2 to 10 microns and over were found to be preferred with layer 14 thicknesses ranging up to about a mil being operable for transparency projection and still thicker films being satisfactory where the resultant image is to be viewed only as a light absorbing, directly viewable image or where thicker films are desirable, for example in the preparation of raised braille images.

The transfer member 42 generally comprises a material having a surface either capable of being rendered tacky as by the application of heat, solvents or the like with or without the accompanying pressures or having a surface which is tacky such as an adhesively coated surface, for example, adhesive tapes. The web is applied, with the adhesive surface against image carrying layer 14, for example, by means of roller 46. After application, the tape is separated from layer 14 and the image portions 40 and portions of layer 14 corresponding to the background adhere in image configuration to the surface of web 42.

It should also be appreciated that a non-adhesive or non-tacky web 42 may be employed if layer 14 is sufficiently tacky. The web and layer 14 are pressed together to attain an adhesive grip and then stripped apart to produce the two separate complementary images. Image portions 40 may or may not transfer to web 42 in this last variation depending on the tackiness of the stripping surface of the transfer member.

Adhesion must be adequate for substantially complete removal or stripping of interfacial layer 14 from the substrate 11 in non-image, background areas during the stripping operation.

Any suitable adhesively surfaced web 42 may be used. Typical such webs include polyethylene terephthalate polyester film backed tapes, cellophane and acetate based tapes such as Scotch brand Magic Transparent Tape No. 810 available from the 3M Company (all the foregoing being preferred for transparent formation), commercially available masking tapes and similar adhesive webs.

It is preferred that the thickness of substrate 11 and web 42, if the images formed on the surfaces are to be used other than a light absorbing directly viewable image, for example as a transparency, be kept relatively thin, on the order of about one mil or less in order not to adversely affect image resolution upon transmission of the image. For lower resolution films of course, the films may be thicker in the order of one-eighth inch thick. Of course, it should be appreciated that FIG. 1 is an illustrative embodiment and that the basic process need not be automated and that the transfer member, illustratively web 42, to be contacted with image carrying layer 14 after development at developing station 26, need not be a thin layer but may comprise a solid member such as wood, plastic elements, metals and the like, of course, which limits the resulting image carried on this member to a directly viewable light absorbing image. Preferably if this support base serving the same purpose as web 42, is not transparent as when a thick metal member is employed, the image produced should contrast with the surface for easier viewing.

The invention hereof, by the proper selection of materials, specifically substrate 11, transfer member 42 and interlayer 14 may be adapted to the production of lithographic masters for the making of multiple copies. By choosing a hydrophilic substrate such as aluminum or aluminized Mylar, as used in Example III, and a hydrophobic material which is wetted by lithographic inks as interlayer 14 such as the graphite in a Lucite binder as used in Example II, after stripping, the image pattern of layer 14 left on the substrate may be used as a lithographic master. By choosing a hydrophilic fracturable material such as the selenium used in Example III, the image pattern of layer 14 and the fracturable material transferred to the transfer member after stripping may also be used as a lithographic master. Any suitable hydrophilic substrate 11 may be used in the makeup of member 10, such as plastics or thin sheets of metal or laminates thereof, incluing such metals as aluminum, steel, zinc, magnesium, chromium and copper. Any suitable hydrophobic lithographic ink wettable material may be chosen from those materials described herein, to make up layer 14, including various resinous and waxy materials. Any suitable wet-out or fountain solution and lithographic printing ink, such as those described in copending application Ser. No. 633,916, filed Apr. 26, 1967, now U.S. Pat. No. 3,554,125, may be employed in using the strip images of this invention as lithographic masters.

The following examples further specifically define the present invention with respect to the use of interfacial layer 14 and stripping techniques with the migration imaging system described herein to form complementary positive and negative images. The parts and percentages are by weight unless otherwise indicated. The examples below are intended to illustrate various preferred embodiments of the strip imaging system of this invention.

Example I

About a ½ mil thick polyethylene terephthalate polyester film available under the trademark Mylar from Du Pont is used as substrate 11. The Mylar film is dip coated in a dispersion of finely divided carbon black in an acrylic resin sold under the trademark Lucite 2045 by Du Pont, prepared by ball milling for about 3 days, about 17% of a codispersion of predispersed carbon black available under the designation Codispersion 31-L-62 from Columbian Carbon Co., containing total solids of about 60%, about 45% carbon black, a dispersing agent and mineral spirits; about 1.5% of Lucite 2045 and the remainder V.M. & P. naphtha. The Mylar is removed from the dispersion and the coating dried to a thickness of about 5 microns containing about 20% Lucite based on the dry weight of the layer. About one 2 micron layer corresponding to layer 12 of a 50% hydrogenated glycerol rosin ester available under the designation Staybelite Ester 10 from the Hercules Powder Co., in toluene is coated over the layer of carbon black in Lucite. A fracturable layer of selenium approximately 0.2 micron in thickness is then deposited over the layer of Staybelite Ester 10 by the inert gas deposition process described in copending application Ser. No. 423,167, filed Jan. 4, 1965. The member 10 is then electrostatically charged in darkness to a positive potential of about 60 volts by means of a corona discharge device, exposed to an optical image with energy in illuminated areas of about $1.5 \times 10^{11}$ photons/cm.$^2$ by means of about a 4,000 angstrom unit light source.

Then the exposed member is dipped in trichlorotrifluoroethane available as Freon 113 from the E. I. Du Pont de Nemours & Co. for about two seconds and removed to produce a faithful replica of the optical image consisting of image portions of selenium on the layer of graphite in the Lucite binder.

The resulting structure is then pressed against an adhesive surface of an adhesive tape commercially available from 3M under the designation Brand 853 Mylar tape, the adhesive surface being stripped away to transfer to the adhesive surface the image portions of selenium and those portions of layer 14 not covered by the selenium, to leave a dense, carbon black in Lucite image with a resolution of more than 60 lp/mm. on the Mylar to produce a dense, stable, light absorbing and directly viewable image which, of course, may also be used as a transparency for image projection purposes. The image on the adhesive surface is complementary to the image formed on the Mylar film and comprises areas of red-brown colored particular selenium and dark graphite in a Lucite binder to form a directly viewable image and one which may be used as a transparency because of a thinness of the selenium portions of the image.

Example II

About a ½ mil thick Mylar film is dip coated in a colloidal graphite conductive pigmented dispersion containing about 20% solids in an organic insulating non-resinous binder of isopropanol available under the designation "dag" dispersion No. 154 from Acheson Colloids Co. The Mylar is removed and the coating dried to a thickness of about 2 microns. About a 3 micron layer of Staybelite Ester 10 is coated over the "dag" dispersion. Polyvinyl carbazole ground to a particle size of about 10 microns is then deposited in about a monolayer over the layer of Staybelite Ester 10. The member is electrostatically charged, exposed and developed as in Example I to form a faithful replica of the optical image consisting of image portions of polyvinyl carbazole on the "dag" layer.

The resulting structure, image side up, is then pressed against an adhesive surface of Brand 853 Mylar tape, the adhesive surface being stripped away to transfer to the adhesive surface the image portions of polyvinyl carbazole and those portions of the "dag" layer not covered by the polyvinyl carbazole, to leave a dense "dag" image with a resolution of more than 60 lp/mm. on the Mylar of the imaging member and to produce on the adhesive film a complementary image comprising areas of substantially transparent polyvinyl carbazole and dark areas of the "dag" layer to form both a directly viewable image and one which may be used as a transparency.

Example III

Example I is followed except that about a ½ mil thick Mylar film having a thin transparent aluminum coating is used as the substrate.

After stripping, both imaged members are used as lithographic duplicating masters to produce prints on a copy sheet.

Although specific components and proportions have been stated in the above particularized description of preferred embodiments of the imaging system of this invention, other suitable materials as listed herein may be used with similar results. In addition, other materials may be added to materials listed herein or variations may be made in the various processing steps described to synergize, enhance or otherwise modify its properties. For example, various dyes, solvents, plasticizers and moisture and other "proofing" agents may be added to the organic binder based, layer 14 configurations. Also, a thin layer of a release agent between the substrate and the interfacial layer hereof may be used to facilitate the release of the interfacial layer from the substrate.

It will be understood that various other changes in the details, materials, steps and arrangements of parts which have been herein described and illustrated in order to explain the nature of the invention will occur to and may be made by those skilled in the art upon a reading of this disclosure and such changes are intended to be included within the principle and scope of this invention.

What is claimed is:

1. An imaging method comprising the steps of:

(a) providing an imaging member comprising
 a substrate;
 an imaging layer releasably residing on said substrate; and
 a continuous electrically insulating layer overlying said imaging layer, said insulating layer being substantially more soluble in at least one solvent in which said imaging layer is substantially less soluble and having in contact with said insulating layer, fracturable migration material;

(b) forming an electrical latent image on said electrically insulating layer;

(c) applying an electrically insulating solvent for said solvent soluble electrically insulating material to said member whereby said insulating material is removed from said releasable imaging layer and portions of said fracturable material are washed away and other portions migrate and are deposited on said releasable imaging layer in image configuration;

(d) presenting a transfer member into contact against the image bearing releasable imaging layer, the presented surface of the transfer member and non-imaged releasable layer portions being characterized to cause adhesion of said transfer member and releasable layer in areas of contact therebetween;

(e) separating said transfer member and said image bearing releasable imaging layer whereby said releasable imaging layer in areas devoid of the image configuration of fracturable material is released from said substrate and is transferred to said transfer member.

2. An imaging method according to claim 1 wherein said transfer member is adhesively surfaced on the surface presented into contact with said releasable imaging layer.

3. An imaging method according to claim 1 wherein said releasable imaging layer comprises a pigment in an organic matrix.

4. An imaging method according to claim 1 wherein said fracturable migration material is electrically photosensitive and wherein said latent image is formed by uniformly electrostatically charging said member and exposing said member to an image pattern of activating electromagnetic radiation.

5. A method of preparing a lithographic duplicating master comprising the steps of:

(a) providing an imaging member comprising
 a hydrophilic substrate;
 a hydrophobic imaging layer releasably residing on said substrate; and
 a continuous electrically insulating layer overlying said imaging layer, said insulating layer being substantially more soluble in at least one solvent in which said imaging layer is substantially less soluble and having in contact with said insulating layer, fracturable migration material;

(b) forming an electrical latent image on said insulating layer;

(c) applying an electrically insulating solvent for said solvent soluble electrically insulating material to said member whereby said soluble material is removed from said releasable imaging layer and portions of said fracturable material are washed away and other portions migrate and are deposited on said releasable uniform layer in image configuration;

(d) presenting a transfer member into contact against the image bearing releasable imaging layer, the presented surface of the transfer member, and the non-imaged releasable imaging layer portions and image pattern of fracturable material being characterized to cause adhesion of said transfer member, and said releasable imaging layer portions and image pattern of fracturable material, in areas of contact therebetween;

(e) separating said transfer member and said image bearing releasable imaging layer, whereby said releasable imging layer in areas devoid of the image configuration of fracturable material is released from said substrate and is transferred to said transfer member along with said image pattern of fracturable materials to leave behind on said hydrophilic substrate an image pattern of hydrophobic, lithographic ink wettable releasable imaging layer material to produce said lithographic master.

6. A method of preparing lithographic duplicating masters comprising the steps of:

(a) providing an imaging member comprising
 a hydrophilic substrate;
 a hydrophobic imaging layer releasably residing on said substrate; and,
 a continuous electrically insulating layer overlying said imaging layer, said insulating layer being substantially more soluble in at least one solvent in which said imaging layer is substantially less soluble and having in contact with said insulating layer, hydrophilic fracturable migration material;

(b) forming an electrical latent image on said insulating layer, (c) applying an electrically insulating solvent for said solvent soluble electrically insulating material to said member whereby said soluble material is removed from said releasable imaging layer and portions of said fracturable material are washed away and other portions migrate and are deposited on said releasable imaging layer in image configuration, (d) presenting a transfer member into contact against the image bearing releasable imaging layer, the presented surface of the transfer member, and the non-imaged releasable layer portions and image pattern of fracturable material being characterized to cause adhesion of said transfer member, and said releasable imaging layer portions and image pattern of fracturable material, in areas of contact therebetween, (e) separating said transfer member and said image bearing releasable imaging layer, whereby said releasable layer in areas devoid of the image configuration of fracturable material is released from said substrate and is transferred to said transfer member along with said image pattern of fracturable material to leave behind on said hydrophilic substrate an image pattern of hydrophilic, lithographic ink wettable releasable imaging layer material and to transfer to said transfer member the image pattern of hydrophilic fracturable material and the background portions of hydrophobic, lithographic ink wettable releasable layer material to thereby produce two complementary lithographic masters.

7. A method of making multiple copies from a lithographic duplicating master comprising the steps of:

(a) providing a lithographic duplicating master as produced by claim 5, (b) applying to the surface of said image bearing hydrophilic substrate a lithographic ink, said ink being distributed thereon conforming to said image pattern of releasable imaging layer material, (c) contacting said ink surface with a copy sheet thereby transferring an imprint of said image to said sheet; and, (d) repeating steps (b) and (c) until the desired number of copies are produced.

8. A method of making multiple copies from a lithographic duplicating master comprising the steps of:

(a) providing a hydrophilic substrate and releasable uniform layer material lithographic duplicating master as produced by claim 6, (b) applying to the surface of said image bearing hydrophilic substrate a lithographic ink, said ink being distributed thereon conforming to said image pattern of releasable imaging layer material, (c) contacting said ink surface with a copy sheet thereby transferring an imprint of said image to said sheet; and, (d) repeating steps (b) and (c) until the desired number of copies are produced.

9. A method of making multiple copies from a lithographic duplicating master comprising the steps of:

(a) providing a hydrophilic fracturable material and releasable uniform layer material lithographic duplicating master as produced by claim 6, (b) applying to the surface of said image bearing hydrophilic fracturable material transfer member surface, a lithographic ink, said ink being distributed thereon conforming to said image pattern of releasable imaging layer material.

(c) contacting said ink surface with a copy sheet thereby transferring an imprint of said image to said sheet; and, (d) repeating steps (b) and (c) until the desired number of copies are produced.

References Cited

UNITED STATES PATENTS 2,968,552 1/1961 Grunlach -------------- 96—1

CHARLES E. VAN HORN, Primary Examiner

M. B. WITTENBERG, Assistant Examiner

U.S. Cl. X.R.

101—456, 457

UNITED STATES PATENT OFFICE
CERTIFICATE OF CORRECTION

Patent No. 3,740,216 Dated June 19, 1973

Inventor(s) WILLIAM L. GOFFE

It is certified that error appears in the above-identified patent and that said Letters Patent are hereby corrected as shown below:

On the cover sheet insert -- The portion of the term of this patent subsequent to July 14, 1987, has been disclaimed. -- .

Signed and sealed this 21st day of January 1975.

(SEAL)
Attest:

McCOY M. GIBSON JR.
Attesting Officer

C. MARSHALL DANN
Commissioner of Patents